US010642898B1

(12) United States Patent
Pratt

(10) Patent No.: US 10,642,898 B1
(45) Date of Patent: May 5, 2020

(54) THREE-DIMENSIONAL GRAPH

(71) Applicant: Patricia D. Pratt, Redondo Beach, CA (US)

(72) Inventor: Patricia D. Pratt, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 244 days.

(21) Appl. No.: 15/484,868

(22) Filed: Apr. 11, 2017

(51) Int. Cl.
*G06T 19/20* (2011.01)
*G06T 11/20* (2006.01)
*G06T 19/00* (2011.01)
*G06F 16/26* (2019.01)
*G06F 16/901* (2019.01)
*G06F 16/2455* (2019.01)

(52) U.S. Cl.
CPC .... *G06F 16/9024* (2019.01); *G06F 16/24554* (2019.01); *G06F 16/26* (2019.01); *G06T 11/206* (2013.01); *G06T 19/003* (2013.01); *G06T 19/20* (2013.01); *G06T 2219/004* (2013.01); *G06T 2219/2012* (2013.01); *G06T 2219/2016* (2013.01)

(58) Field of Classification Search
CPC .... G06F 16/26; G06F 16/287; G06F 16/9024; G06F 16/9027; G06F 16/24554; G06T 19/003; G06T 19/20; G06T 11/206; G06T 2219/2012; G06T 2219/004; G06T 2219/2016
See application file for complete search history.

(56) References Cited

U.S. PATENT DOCUMENTS

| 4,792,319 | A | 12/1988 | Svagerko |
| 5,001,634 | A | 3/1991 | Nordin |
| 5,377,166 | A | 12/1994 | Kuhn |
| 5,799,312 | A * | 8/1998 | Rigoutsos .......... G06K 9/00201 |
| 6,750,864 | B1 * | 6/2004 | Anwar .................. G06T 11/206 |
| | | | 345/440 |
| 7,034,826 | B1 | 4/2006 | Bronder |
| 7,408,554 | B2 * | 8/2008 | Lawson, Jr. ........... G06Q 10/10 |
| | | | 345/442 |

(Continued)

FOREIGN PATENT DOCUMENTS

GB 2474053 A * 4/2011
WO WO-02095622 A2 * 11/2002 .......... G06T 11/206

OTHER PUBLICATIONS

Rohrer et al., "The Shape of Shakespeare: Visualizing Text using Implicit Surfaces", 1998, Proceedings IEEE Symposium on Information Visualization (Cat. No. 98TB100258) (Year: 1998).*

(Continued)

*Primary Examiner* — James E Richardson
(74) *Attorney, Agent, or Firm* — Tarolli, Sundheim, Covell & Tummino LLP

(57) ABSTRACT

A rendering engine can generate a three-dimensional (3D) graph. The 3D graph can include a plurality of partitions contiguously connected. Each partition corresponds to a respective data record in a data set and a surface of each partition corresponds to a given parameter that references a given data field in the respective data record. Visual indicia of the surface of each partition can vary as a function of a value for the given data field of the respective data record.

15 Claims, 8 Drawing Sheets

(56) References Cited

U.S. PATENT DOCUMENTS

| | | |
|---|---|---|
| 8,274,506 B1 | 9/2012 | Rees |
| 8,341,111 B2 | 12/2012 | Patil et al. |
| 2011/0175905 A1* | 7/2011 | Hao .................... G06T 11/206 345/419 |
| 2013/0100133 A1* | 4/2013 | Elber ..................... G06T 19/20 345/420 |
| 2015/0073961 A1* | 3/2015 | Cristoforo ........... G06F 3/04815 705/37 |
| 2015/0169758 A1 | 6/2015 | Assom et al. |

OTHER PUBLICATIONS

Ning Wang, et al., "Geometric Properties of the Icosahedral-Hexagonal Grid on the Two-Sphere" Oct. 2011. Society for Indurstrial and Applied Mathematics. pp. 2536-2559.

Final Office Action for U.S. Appl. No. 15/585,479 dated Feb. 21, 2020.

* cited by examiner

THREE-DIMENSIONAL GRAPH

TECHNICAL FIELD

The present disclosure relates to systems and methods for generating a three-dimensional graph.

BACKGROUND

"Big data" is a term for data sets that are so large or complex that traditional data processing applications are inadequate. Challenges include analysis, capture, data curation, search, sharing, storage, transfer, visualization, querying and information privacy. The term "big data" often refers simply to the use of predictive analytics or certain other advanced methods to extract value from data, and seldom to a particular size of a data set. Accuracy in big data may lead to more confident decision making and better decisions can result in greater operational efficiency, cost reduction and reduced risk.

A spheroid, or ellipsoid of revolution, is a quadric surface obtained by rotating an ellipse about one of its principal axes; in other words, an ellipsoid with two equal semi-diameters. If the ellipse is rotated about the major axis of the ellipse, the result is a prolate (elongated) spheroid, shaped like an American football or rugby ball. If the ellipse is rotated about a minor axis of the ellipse, the result is an oblate (flattened) spheroid, shaped like a lentil. If the generating ellipse is a circle, the result is a sphere. A spheroid has circular symmetry.

SUMMARY

One example relates to a non-transitory machine readable medium having machine executable instructions. The machine executable instructions include a rendering engine that generates a three-dimensional (3D) graph. The 3D graph can include a plurality of partitions contiguously connected. Each partition corresponds to a respective data record in a data set and a surface of each partition corresponds to a given parameter that references a given data field in the respective data record. Visual indicia of the surface of each partition can vary as a function of a value for the given data field of the respective data record.

Another example relates to a non-transitory machine readable medium having machine executable instructions. The machine executable instructions can include a graph data viewer that displays a 3D graph stored in a scalable data structure. The 3D graph can include a plurality of partitions contiguously arranged on a surface of a spheroid. Each partition corresponds to a respective data record in the data set and an edge of a given partition has visual indicia indicating a value in a data field reference by a parameter assigned to the edge of the given partition.

Yet another example relates to a method. The method can include assigning, by a rendering engine operating on a computing device, parameters that reference data fields of data records to features of partitions for a 3D graph. The method can also include varying, by the rendering engine, indicia of the features of the partitions of the 3D graph based on values in the data fields referenced by the parameters. The method can yet further include outputting, at a graph data viewer, the 3D graph.

DETAILED DESCRIPTION

This disclosure relates to a system and method for generating and viewing a three-dimensional (3D) graph. The system can include a rendering engine that generates the 3D graph and provides an interface that provides user controls for mapping parameters that reference data fields of a data set to features of partitions of a base shape of the 3D graph. The features of the partitions (e.g., edges or a surface) can be manipulated by the rendering engine to represent a value stored in the data set for the corresponding parameter. The system can also include a graph data viewer that communicates with a graph data server to access a scalable graph data structure to provide a graphical user interface (GUI) for viewing the 3D graph. The GUI can include user controls for changing an orientation and a viewing perspective of the 3D graph. The GUI also includes a data panel for outputting data values mapped to selected partition features in the 3D graph.

Figure 1:
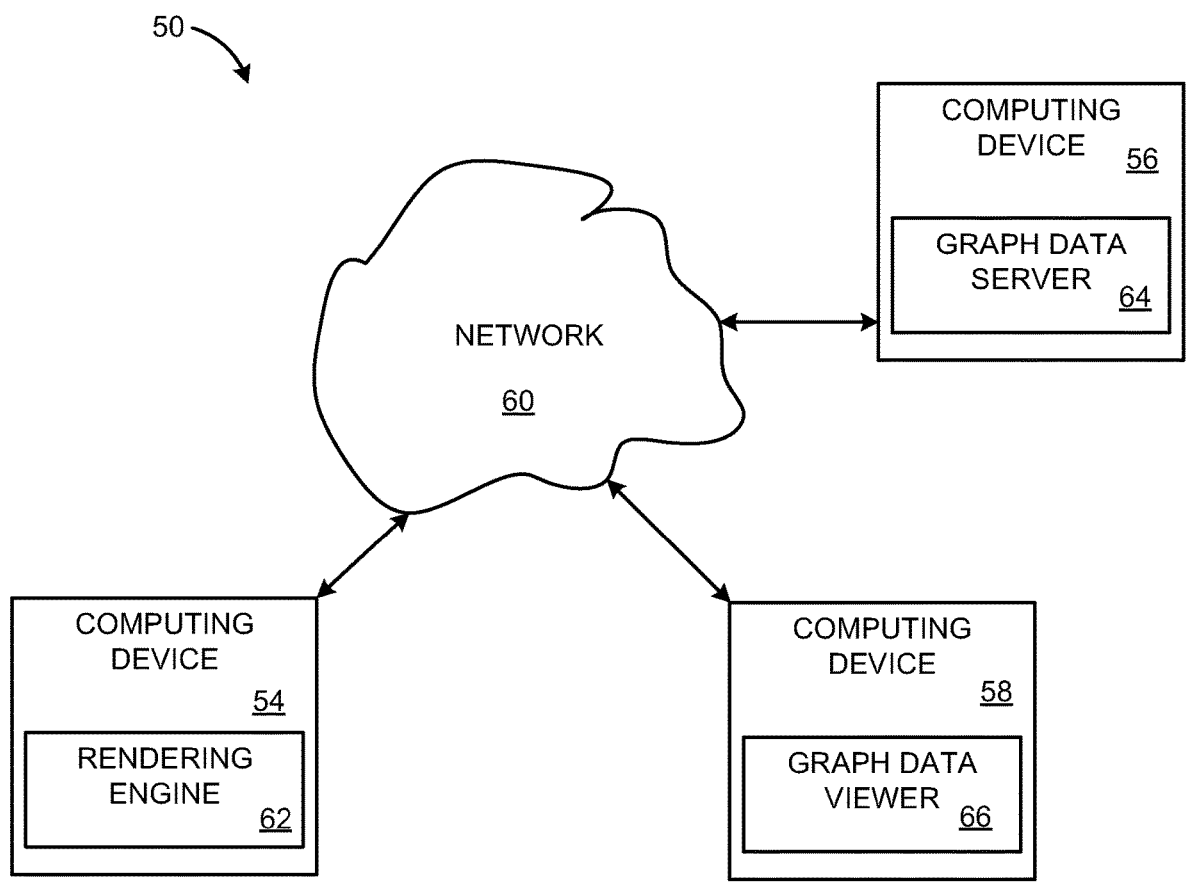
FIG. 1 illustrates an example of a system for generating and viewing a three-dimensional (3D) graph.

FIG. 1 illustrates a system 50 for generating and viewing a three-dimensional (3D) graph. The system 50 can include computing devices 54, 56 and 58 that communicate via a network 60. The network 60 may be a public network (e.g., the Internet), a private network (e.g., a local area network) or a combination thereof (e.g., a virtual private network). As used herein, the term 3D graph denotes a graph represented in a three-dimensional coordinate system (e.g., a Cartesian, spherical or cylindrical coordinate system).

Each computing device 54, 56 and 58 can be implemented as a general purpose computer having a non-transitory machine readable memory. The machine readable memory can be implemented as volatile memory (e.g., random access memory (RAM)), non-volatile memory (e.g., flash memory, a hard disk drive, a solid state drive, etc.) or a combination thereof. Additionally, each computing device 54, 56 and 58 can be implemented as a mobile computing device (e.g., a smartphone or tablet computer, a computer console, etc.), a desktop computer, a laptop computer, a server blade, etc. Moreover, although the system 50 illustrates and describes the computing devices 54, 56 and 58 as performing different functions, in some examples, the functions can be integrated onto one computing device and/or distributed across multiple computing devices (e.g., in a computing cloud).

The computing device 54 can execute a rendering engine 62. The rendering engine 62 can be a computer application that provides a GUI for generating and editing the 3D graph. The 3D graph can be formed of a plurality of contiguously positioned partitions, such as polygons arranged over a base shape and manipulated to represent data. In some examples, the partitions can be arranged about a surface of a 3D structure (the base shape) such as a spheroid or a polyhedron. In particular, the GUI can provide an interface for mapping data parameters that reference data fields/variables of a data set (or multiple data sets) onto features of the partitions in the 3D graph. Such features can include edges and/or a surface of the partitions in the 3D graph.

As used herein throughout this disclosure, the term "shape" refers both two-dimensional (2D) and 3D structures/forms. That is, the term shape includes both the outline of an enclosed 2D object and specific instances of 3D structures that may have a portion (e.g., a cross-section) that resemble 2D shapes.

In some examples, each partition can be manually assigned (e.g., in response to user input) a different data record in the data set. In other examples, each partition can be automatically assigned a data record based on an associated position of each partition on the 3D structure. For example, in a situation where the 3D structure represents the earth, each partition can correspond to a different region on the earth. Accordingly, in this example, the rendering engine 62 can associate each partition in the 3D graph with a data record in the data set that contains information (data values) for the particular geographic region covered by each respective partition.

The rendering engine 62 can retrieve the data (values) from the data set based on the mapped data parameters for each mapped data record and generate the 3D graph based on the retrieved values. To generate the 3D graph, the rendering engine 62 can manipulate visual indicia the features of the partitions that have been assigned the parameters based on the values retrieved from the data set. For example, the rendering engine 62 can vary a thickness, pattern, length and/or color of an edge (a line) of a partition (e.g., a polygon) to indicate a particular value for the parameter assigned to the feature. For instance, if an edge of each partition is assigned a parameter corresponding to a current population for a data record having data for a corresponding geographic region, the rendering engine 62 can change a visual appearance (e.g., thickness, pattern, color and/or length) of the edge to indicate a current population (e.g., a value corresponding to the current population).

Similarly, if a surface of each partition is assigned another parameter that references another data field from each respective data record (which corresponds to a geographic location), such as a current temperature, the rendering engine 62 can manipulate indicia of the surface of the partition to represent the value for the data field referenced by the assigned parameter. For example, the rendering engine 62 can form an apex (or a rounded corner) connected to edges of the partition to form a pyramid (or other polyhedron) at the partition. In such a situation, the height and/or of the resultant pyramid can characterize the value in the data record for the data field referenced by the parameter assigned to the surface of the partition. For instance, in the example where each partition surface represents the current temperature of a geographic region, the rendering engine 62 can assign a positive or negative height to the pyramid based on the current temperature for the geographic region.

The features of each partition can be normalized with respect to each other. In this manner, a viewer of the 3D graph can quickly compare values represented by the features of the partitions. Moreover, the rendering engine 62 can generate a scalable data structure (e.g., a computer file) that has data for outputting the 3D graph in a user interface (a GUI). The scalable data structure can be generated such that the 3D graph can be scaled/parameterized to nearly any size since the features of the partitions are normalized with respect to each other.

In some examples, the computing device 56 can execute a graph data server 64 that can access the scalable data structure and communicate with a graph data viewer 66 operating on the computing device 58. In some examples, the graph data viewer 66 can be a front end (user interface) and the graph data server 64 can be a back end (e.g., an engine) of an integrated computer application. The graph data viewer 66 can output a graphical representation of the 3D graph to a user. The graph data viewer 66 can provide user controls for changing an orientation of the 3D graph and/or changing a viewing perspective of the 3D graph.

The graph data viewer 66 can communicate with the graph data server 64 to allow a user to view and "fly through" a representation of the 3D graph. Additionally, the graph data viewer 64 can allow the user to select (in respond to user input) a partition of the 3D graph and output a data panel that outputs data values in data points corresponding to the selected partition. Moreover, the graph data viewer 66 can allow selection of multiple partitions (polygons) on the 3D graph. In this situation, the data panel can output data values for each selected partition concurrently, thereby allowing the user to compare and contrast the interrelationship of the data.

The viewer of the 3D graph can efficiently analyze information characterized in the 3D graph to reduce a "cognitive burden" on the viewer. For example, by employing the system 50, complex data sets (e.g., big data) can be efficiently organized and mapped onto the 3D graph. In this manner, the viewer (a user) can visualize and correlate data in ways that are not apparent using a conventional matrix and/or spreadsheet.

Figure 2:
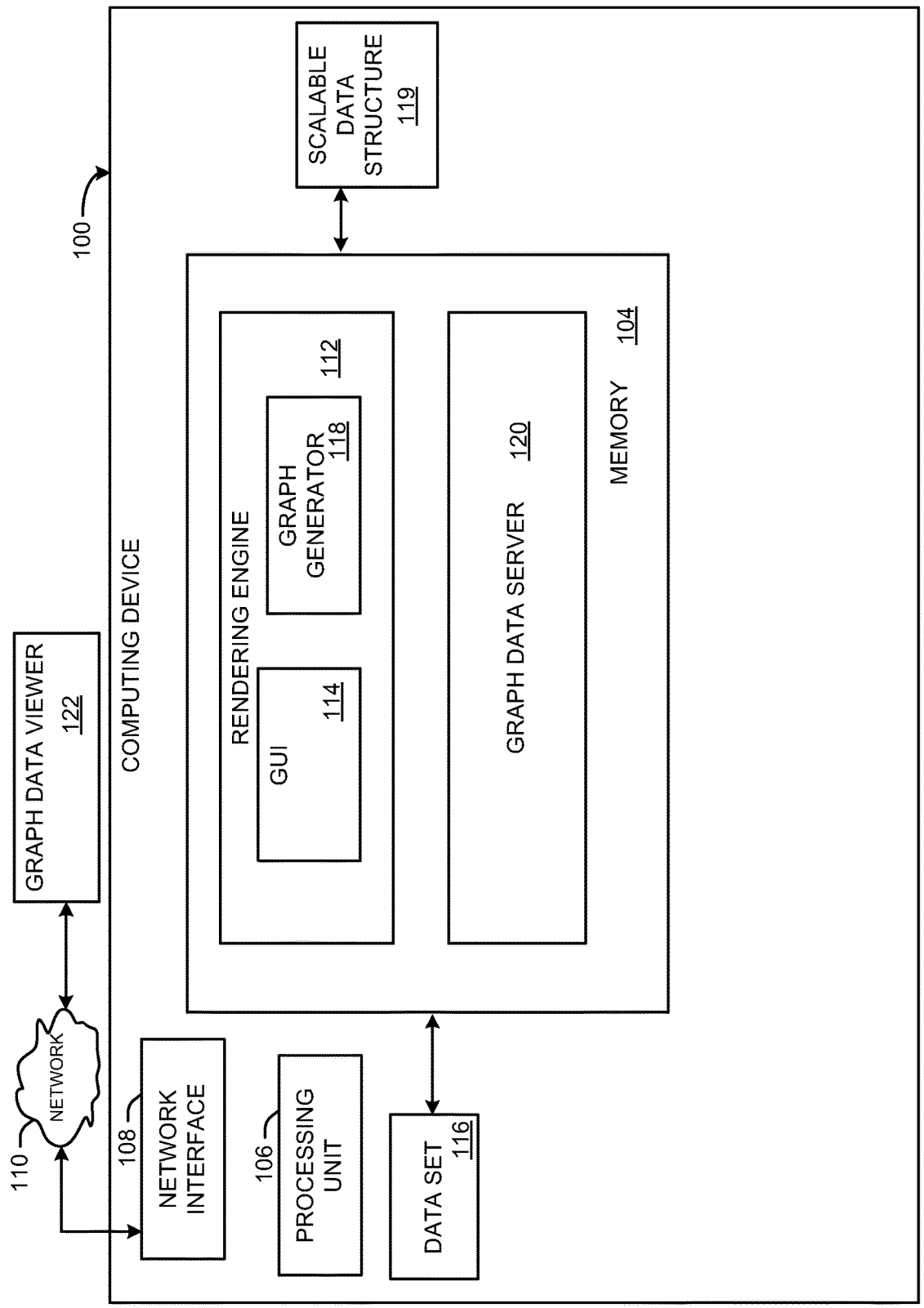
FIG. 2 illustrates an example of a computing device for generating a 3D graph.

FIG. 2 illustrates an example of a computing device 100 that can generate a 3D graph. The 3D graph can be a scalable, three-dimensional graph formed of contiguously arranged partitions (e.g., polygons) manipulated to represent data. The computing device 100 can include a memory 104 that can store machine readable instructions. The memory 104 could be implemented, for example, as non-transitory computer readable media, such as volatile memory (e.g., random access memory), nonvolatile memory (e.g., a hard disk drive, a solid state drive, flash memory, etc.) or a combination thereof. The computing device 100 can also include a processing unit 106 to access the memory 104 and execute the machine-readable instructions. The processing unit 106 can include, for example, one or more processor cores. The computing device 100 can include a network interface 108 configured to communicate with a network 110. The network interface 108 could be implemented, for example, as a network interface card. The network 110 could be implemented for example, as a public network (e.g., the Internet), a private network (e.g., a carrier network) or a combination thereof.

The computing device 100 could be implemented, for example in a computing cloud. In such a situation, features of the computing device 100, such as the processing unit 106, the network interface 108, and the memory 104 could be representative of a single instance of hardware or multiple instances of hardware with applications executing across the multiple of instances (i.e., distributed) of hardware (e.g., computers, routers, memory, processors, or a combination thereof). Alternatively, the computing device 100 could be implemented on a single dedicated computing device.

Figure 3:
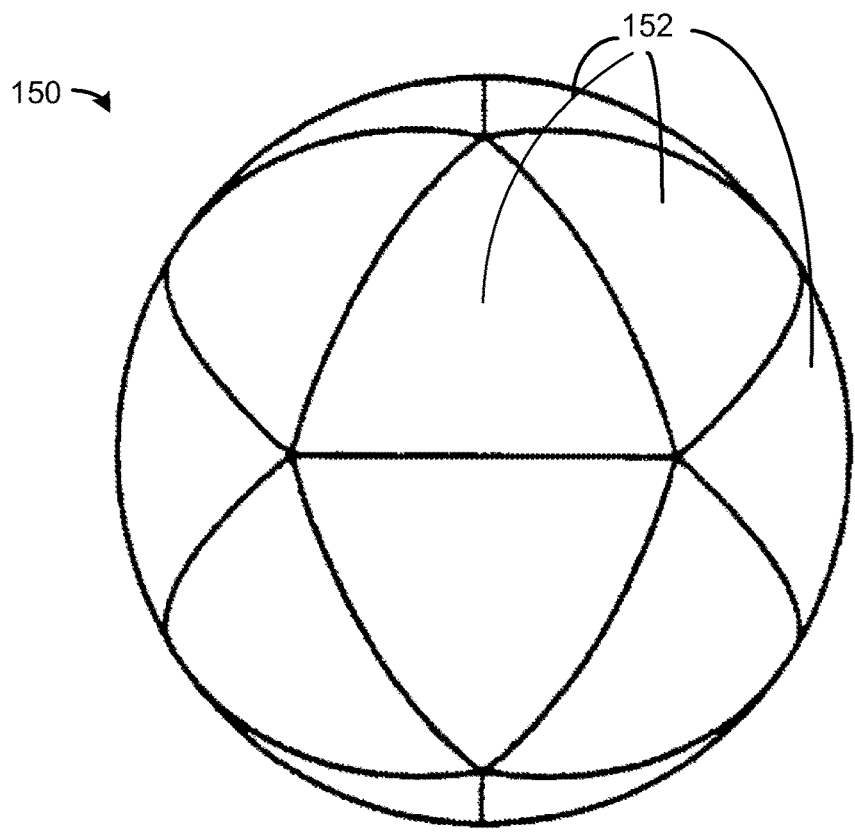
FIG. 3 illustrates an example of a base shape of a 3D graph.
Figure 4:
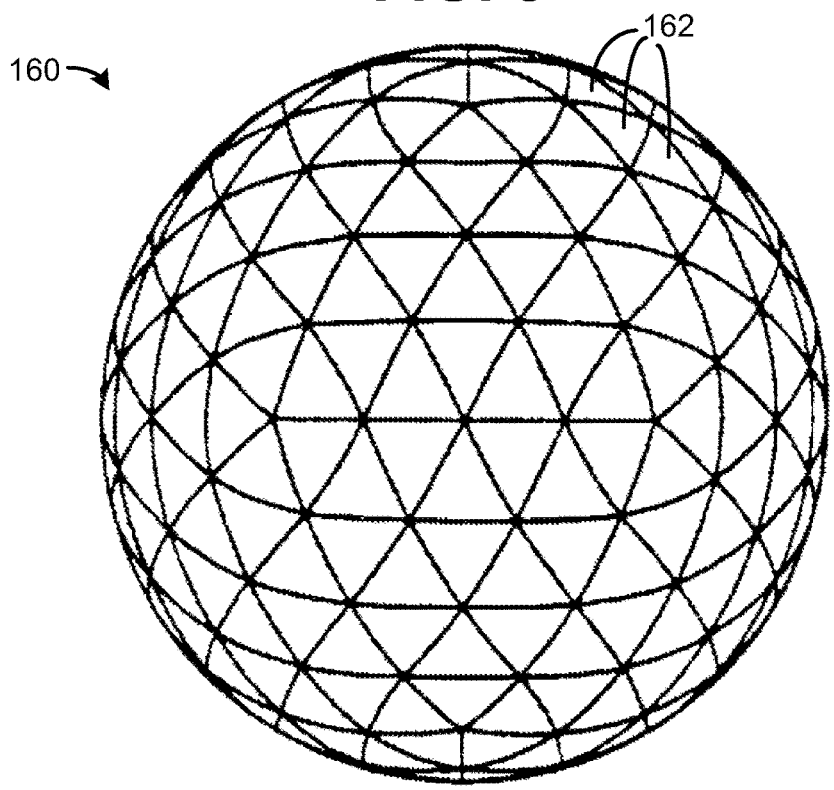
FIG. 4 illustrates another example of a base shape of a 3D graph.

The memory 104 can include a rendering engine 112. The rendering engine 112 can include a graphical user interface (GUI) 114 that can be employed to select a base shape for a three-dimensional 3D graph. The base shape of the 3D graph can be, for example, a spheroid or other object with a set of partitions (cells). FIG. 3 illustrates an example of a spheroid 150 that could be employed as the base shape of the 3D graph. The spheroid 150 has as a plurality of spherical triangles 152 distributed about a surface of the spheroid 150. The spherical triangles 152 can be employed as the partitions of the spheroid 150. FIG. 4 illustrates another example of a spheroid 160 with smaller spherical triangles 162 that implement the partitions of the spheroid 160. For purposes of simplification of explanation, not all of the spherical triangles 152 and 162 are labeled.

Figure 5:
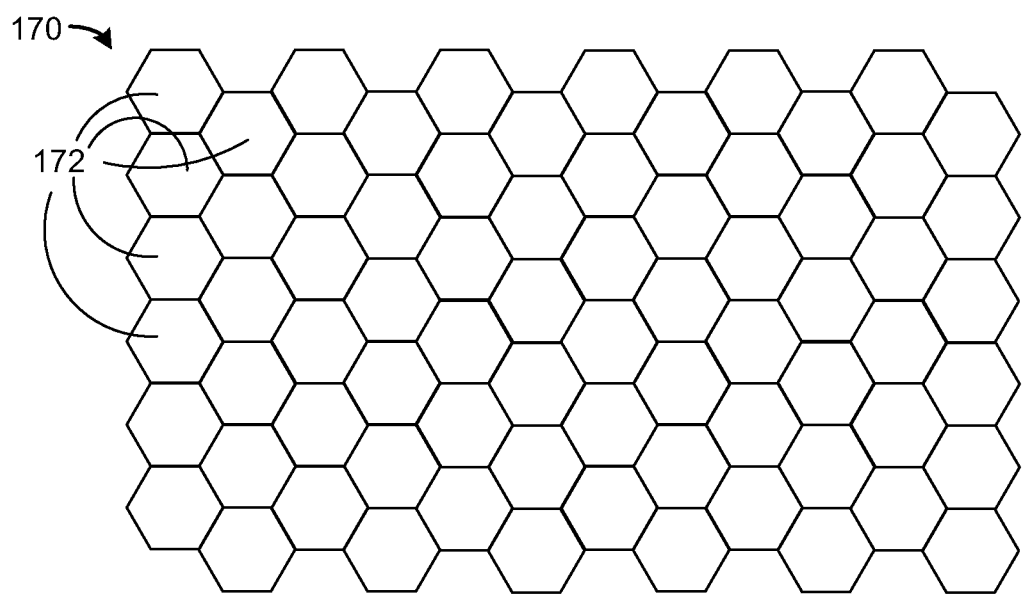
FIG. 5 illustrates yet another example of a base shape of a 3D graph.

Referring back to FIG. 2, although the examples in FIGS. 3 and 4 depict spherical triangles on a surface of the base shape of the 3D graph, in another example, any geometric shape/form that provides regular tiling across a contiguous surface of the base shape, such as a (spherical) square, a triangle, a rhombus, or a hexagon could be employed as a partition of the base shape for the 3D graph. Additionally, in some examples, the partitions may be arranged in a two-dimensional plane. For example, FIG. 5 illustrates a two-dimensional tiling 170 that could be employed as the base shape for the 3D graph. The two-dimensional tiling 150 includes hexagons 152 arranged contiguously across the two-dimensional tiling.

The GUI 114 can also be employed by the user to assign (one or more) parameters to each partition of the base shape for the 3D graph or some subset thereof. In some examples, the GUI 114 can provide user controls for selecting a given partition and assigning parameters to the partition. The parameters can reference data fields (items) from a data set 116, or data fields (items) from multiple data sets. The data set 116 can represent an abstract data type (ADT).

The data set 116 can include a plurality of data records from a database or data table. Table 1 depicts a simple example of a data record that could be employed to implement one of the plurality of data records in the data set 116.

TABLE 1

| RECORD ID | VALUE |
|---|---|
| DATA FIELD 1 | 9 |
| DATA FIELD 2 | 25 |
| ... | |
| DATA FIELD K | 215 |

As is depicted in Table 1, the data record can have a record identifier (ID) (labeled in table 1 as "RECORD ID") that uniquely identifies the data record. The record ID could be, for example, a key field of the data set 116. The data record of Table 1 also includes K number of data fields, where K is an integer greater than or equal to one. Each data field can be populated with a value. In some examples, values (data) populating the data fields of a data record in the data set 116 can be provided from the network 110. Additionally or alternatively, the data populating the data fields of a data record in the data set 116 can be generated locally at the computing device 100. In still other examples, the data populating the data fields of a data set 116 can be received from an external source, such as a sensor (e.g., a radar sensor, a temperature sensor, etc.).

Figure 6:
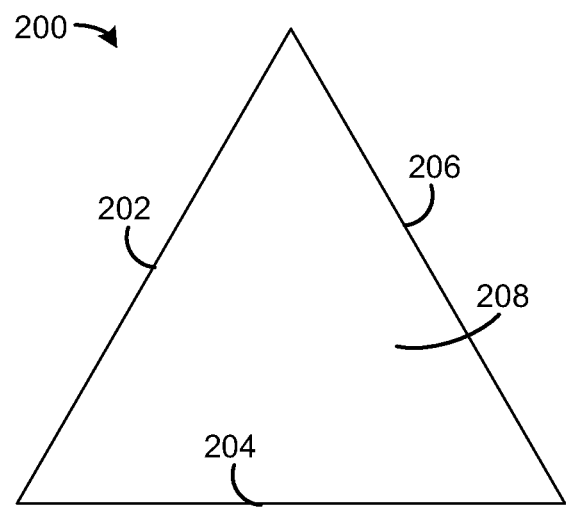
FIG. 6 illustrates an example of a partition of a 3D graph.

FIG. 6 depicts an example of a partition 200 of a base shape for a 3D graph that can be employed to implement the given partition. The partition 200 is depicted as a triangle with three (3) sides, 202, 204 and 206. Moreover, the triangle 200 also includes a surface 208 (an enclosed area). By employing the GUI 114, the user can assign parameters that reference data fields of the data set 116 to each of the sides 202, 204 and 206. Additionally, the user can employ the GUI 114 to assign a parameter that references a data field of the data set 116 to the surface 208.

Referring back to FIG. 2, the user controls of the GUI 114 can include an option for employing the given partition as a template for applying the same data fields of different data records of the data set 116 to other partitions in the base shape of the 3D graph. In other examples, the user can employ the GUI 114 to assign each partition in the base shape of the 3D graph different parameters. In still other examples, the graph generator 118 may be programmed to assign the parameters to the partitions automatically base on predetermined factors (e.g., geographic location).

As noted, the GUI 114 can allow the user to select the base shape. Additionally, in some examples, the rendering engine 112 can analyze the data set 116 and/or constraints to determine a viable base shape that can adequately represent the (final parameterized) 3D graph. Furthermore, in some such situations, there may be a plurality of viable base shapes and the GUI 114 can allow a user to select a particular viable base shape.

The rendering engine 112 can also include a graph generator 118 that retrieves data (values) from the data set 116 based on the parameters (referencing data fields of a data record) assigned to each partition. The graph generator 118 can manipulate visual indicia of the partitions of the base shape of the 3D graph based on the values in the data fields of the data set 116.

As one example, in FIG. 6, lengths of the sides 202, 204 and 206 can be adjusted based on values in the data set 116 for the assigned parameters. Additionally, the surface 208 can be raised or lowered to form an apex (vertex or a rounded corner) based on the value for the data field referenced by the parameter assigned to the surface 208. Additionally or alternatively, bar graphs (e.g., colors, line thickness, line patterns, angles, etc.) can be manipulated to represent values in data fields referenced by assigned parameters for some (or all) of the features of the triangle 200. For example, in some situations, a line pattern or thickness along the edges 202, 206 and 204 can be changed to represent values for certain parameters, and the apex may be raised or lowered to represent a value for a data field referenced by another parameter. Additionally or alternatively, an angle of intersection of edges (lines) in the 3D graph 200 could be varied to characterize a parameter in the data set 116. That is, specific angles at each intersection (or some subset thereof) of edges (lines) in the 3D graph 200, such as a 45 degree angle, a 33.5 degree angle, a 90 degree angle, etc. could represent a specific parameter.

To facilitate understanding of the present disclosure, several extended examples are described. In particular, in a first extended example ("first example"), each data record of the data set 116 could represent a stock of a particular stock market. In the first example, the record ID of each data record could be a stock trading symbol (code) of the given stock. Moreover, in the first example, a first data field (e.g., data field 1) could be a current stock price for the given stock in a particular day, a second data field (e.g., data field 2) could be a total number of trades of the stock in the particular day and a third data field (e.g., data field 3) could be a net worth of the of the company associated with the given stock. Furthermore, a fourth data field (e.g., data field 4) could be a change in stock price in the particular day.

The graph generator 118 can scale/parametrize (normalize) the partitions of the base shape of the 3D graph based on the values of the data fields referenced by parameters assigned to each partition. Stated differently, the graph generator 118 can scale/parameterize the partitions of the base shape of the 3D graph such as an edge or a surface based on the values assigned to the data set to generate the 3D graph.

Figure 7:
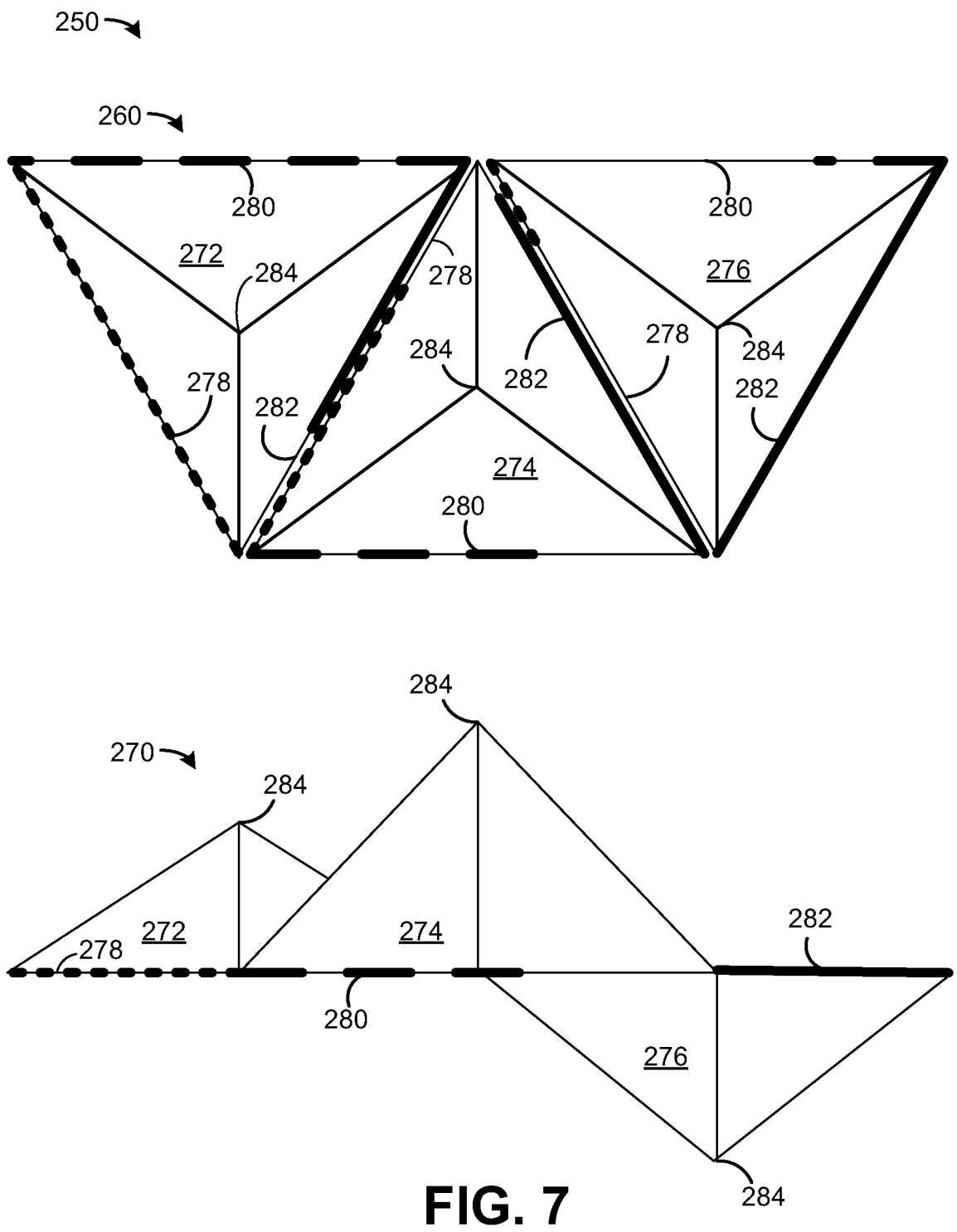
FIG. 7 illustrates an example of a 3D graph.

FIG. 7 illustrates an example of a 3D graph 250 that could be generated by the graph generator 118. The 3D graph 250 could be an instance of a 3D graph generated for the first example. The 3D graph 250 is depicted with a top view 260 and a side view 270. In the 3D graph 250, three (3) pyramids 272, 274 and 276 with triangle bases are depicted, but in other examples, more or less pyramids (or different base shapes) could be employed. Each pyramid 272, 274 and 276 is associated with a different data record (different record IDs) of the data set 116. In the first example, each pyramid 272, 274 and 276 can be associated with a different stock. For instance, it is presumed that the pyramid 272 is assigned to record ID "ABC", the pyramid 274 is assigned the record ID "EFG" and the pyramid 276 is assigned the record ID "HIJ", wherein each record ID identifies a particular stock.

Each base triangle of the pyramids 272, 274 and 276 includes three (3) sides 278, 280 and 282 that have each been assigned a parameter that references a data field of the corresponding record ID. Additionally, each pyramid 272 274 and 276 includes an apex 284 that corresponds to a triangle surface (e.g., the surface 208 of FIG. 6) that has been raised or lowered based on a value of data field referenced by a parameter assigned to the surface. In the first example, it is presumed that the side 278 has been assigned a parameter referencing a data field corresponding to a current stock price and the side 280 has been assigned a parameter referencing a data field corresponding to a total number of trades in a particular day and the side 282 has been assigned a parameter referencing a data field corresponding to a net worth of a company associated with each stock. Moreover, in the first example, it is presumed that the apex (corresponding to a surface) has been assigned a parameter referencing a data field representing a change in stock value for the particular day.

In the example illustrated, a length of a patterned line corresponds to a data value for a data field referenced by an assigned parameter. Moreover, the length of each patterned line for the sides 278, 280 are 282 are normalized relative to other values. For example, in the 3D graph 200, the length of the patterned line overlaying the side 278 for the pyramid 272 fully extends between two vertices of the pyramid 272. Conversely, the patterned line of the side 278 of the pyramid 276 extends about 25% of the length between two vertices of the pyramid 276. Similarly, the patterned line of the side 278 of the pyramid 274 extends about 75% of the length between two vertices of the pyramid 274. In the first example, this denotes that the stock represented by the pyramid 272 (stock "ABC") has had the most trading among each of the stocks depicted in the 3D graph 250. Additionally, the patterned lines can also denote the stock represented by the pyramid 276 (stock "HIJ") has had about 25% as much trading in the particular day as the stock represented by the pyramid 272 (stock "ABC"). Similarly, the patterned lines of the 3D graph 250 can indicate that the stock represented by the pyramid 274 (stock "EFG") has had about 75% as much trading in the particular day as the stock represented by the pyramid 272 (stock "ABC").

Furthermore, in the first example, each pyramid 272, 274 and 276 has an apex 284 with height corresponding to a change in the stock price in the particular day. As evident in the side view 270 the stock associated with the pyramid 274 (stock "EFG") has had the greatest increase in value in the particular day. Similarly, the stock associated with the pyramid 272 (stock "ABC") has increased by amount 50% as much as the stock associated with the pyramid 274 has increased. Furthermore, in the first example, it is presumed that the stock represented by the pyramid 276 (stock "HIJ") has decreased in value (indicated as a downward height of the apex 284 of the pyramid 276) in the particular day, and the decrease is about ¾ as much as the increase in the value of the stock assigned to the pyramid 274.

Referring back to FIG. 2, in a second example ("second example"), each data record of the data set 116 could represent radar data. In the second example, the record ID of each data record could correspond to a geographic direction. Moreover, a first data field in the data set 116 could represent radar detection associated with the geographic direction. Additionally, in some examples, a second data field in the data set could represent a particular geographic direction. In this manner the data set 116 could represent data that characterizes a detected radar strength in multiple directions from a point (e.g., up to 360 degrees).

In some examples, the graph generator 118 can be configured to assign parameters to partitions based on values of a data field or the record IDs in the data set. For instance, in the second example, a data field (or the record ID) identifies a geographic direction, the graph generator 118 can assign each partition (or some subset thereof) a particular data record based on the identified geographic direction relative to a point. In this manner, from a perspective of the point, the resultant 3D graph corresponds to a direction of view.

Figure 8:
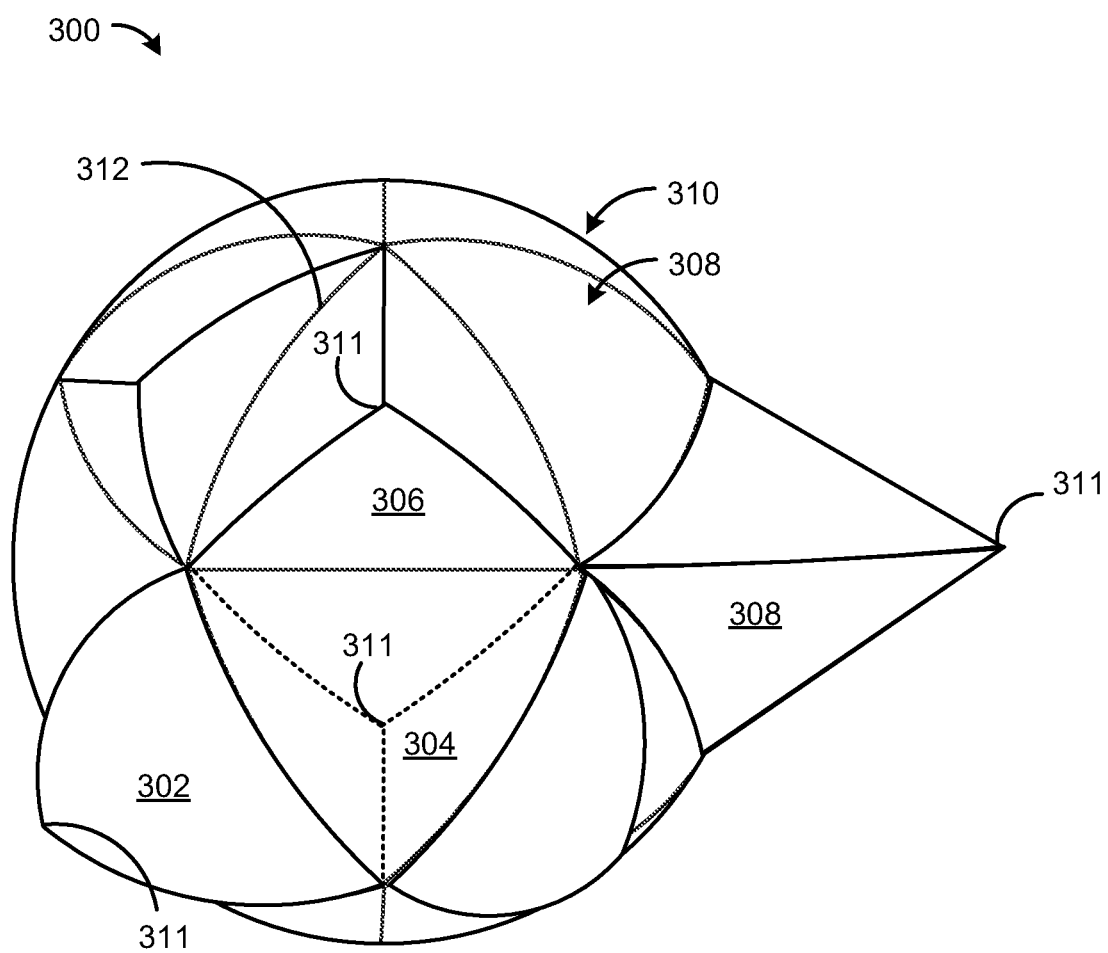
FIG. 8 illustrates another example of a 3D graph.

FIG. 8 illustrates an example of a 3D graph 300 that could be generated by the graph generator 118. The 3D graph 300 could be an instance of a 3D graph generated in the second example. The 3D graph 300 has a base shape of a spheroid with a plurality of spherical triangles, such as the spheroid 150 of FIG. 3. The 3D graph 300 could be generated in a situation where the data set is implementing the second example. The 3D graph 300 could be characterized as resembling a spiked ball.

The 3D graph 300 can include a plurality of spherical pyramids, including spherical pyramids 302, 306, 308 and 310. For purposes of simplification of explanation, not all of the spherical pyramids of the 3D graph 300 are labeled. In the second example, each of the spherical pyramids 302, 306, 308 and 310 are assigned data records (from the data set 116) based on the direction of each spherical pyramid 302, 306, 308 and 310 relative to a center point of the 3D graph 300 (hidden from view). In other examples, the assignment of data records and/or parameters may be implemented differently.

Each spherical pyramid 302, 306, 308 and 310 has an apex 311 with a height that corresponds to a value of an assigned data field. Similar to the 3D graph 250 of FIG. 2, the graph generator 118 can normalize the height of each pyramid 302, 306, 308 and 310 based on the associated data values. In the second example, each apex 311 can correspond to radar strength detected at the associated geographic direction. Thus, as illustrated, in the geographic direction associated with the pyramid 308, the detected radar strength is strongest.

Moreover, in the 3D graph 300, the pyramid 304 has an inward directed apex 311 (represented as dashed lines). In the second example, this could represent a negative value, or an indication that radar is blocked (e.g., jammed) in the direction associated with the pyramid 304.

Referring back to FIG. 2, in some examples, the graph generator 118 can apply a smoothing function (e.g., a hexikes, Zernikes, or similar function) to smooth seams between data points to provide estimated/extrapolated data between discrete data points in the extracted data. The graph generator 118 can generate the scalable data structure 119, which can be implemented, for example, as a computer file. The scalable data structure 119 can include the 3D graph (e.g., the 3D graph 250 of FIG. 7 and/or the 3D graph 300 of FIG. 8) along with links to associated data values (mapped/retrieved from the data set 116).

In some examples, the graph generator 118 can update the scalable data structure 119 periodically or in real time (e.g., within about 10 seconds) based on updates to the data set 116. For instance, in the first example, throughout a day of stock trading, stock prices and a total number of stock trades. In response to such changes, values of the data set 116 change and the graph generator 118 can rescale the 3D graph of the scalable data structure to reflect the changes.

The scalable data structure 119 can be stored on a graph data server 120. In some examples, the graph data server 120 can be implemented as an external computing device. In other examples, the graph data server 120 can be local to the computing device 100.

A graph data viewer 122 can communicate with the graph data server 122 to access the scalable data structure 119. In some examples, the graph data viewer 122 can be a client application executing on a remote computing device, such as a desktop computer, a tablet computer, a console computer, a smartphone, etc. In this situation, the graph data server 120 and the graph data viewer 122 can communicate via the network 110. In other examples, the graph data viewer 122 can be integrated with the rendering engine 112 of the computing device 100, and can access the scalable data structure 119 directly. Moreover, in some examples, the graph data viewer 122 can be a plug-in for another application, such as a computer aided drafting (CAD) software application. The graph data viewer 122 can provide a GUI that outputs the 3D graph and allows a user to change an orientation and/or perspective of view. Additionally, the GUI provided by the graph data viewer 122 output data represented by partitions of the 3D graph.

Figure 9:
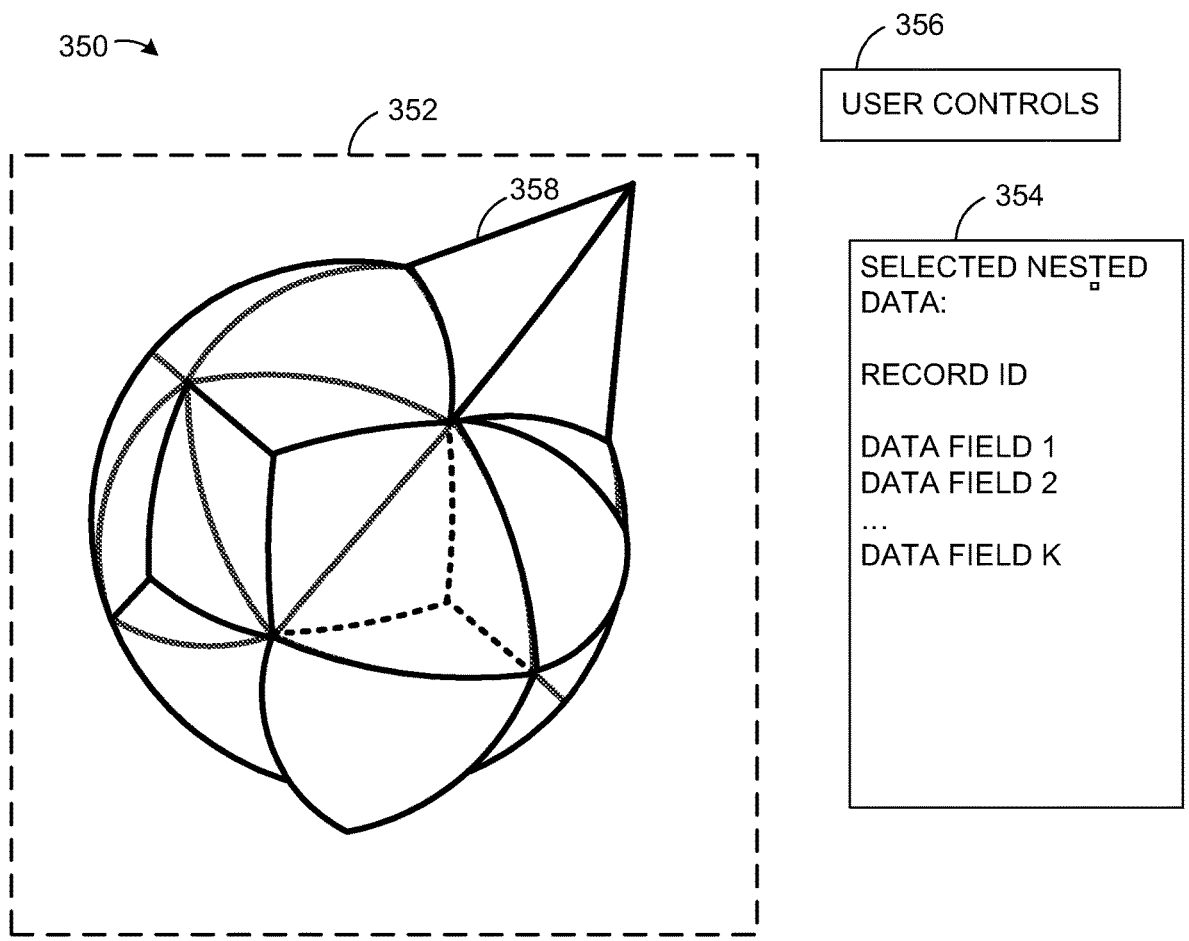
FIG. 9 illustrates an output of a GUI that includes a 3D graph.

FIG. 9 illustrates an example of a GUI output 350 (e.g., a screenshot or partial screenshot) of the graph data viewer 122. The GUI output 350 includes a three-dimensional view of a 3D graph 352 and a data panel 354. The GUI output 350 also includes user controls 356 (e.g., icons, sliders, radio buttons, etc.) for manipulating a view of the 3D graph 352.

The 3D graph 352 is a fully rotatable 3D graphical object corresponding to the 3D graph 250 of FIG. 7 or the 3D graph 300 illustrated in FIG. 8. The user controls 356 can allow a user to change an orientation of the 3D graph 352. Additionally, the user controls 356 can allow a user to change a scale (shrink or expand) the 3D graph 352. Moreover, since each feature (line or surface) of the 3D graph 352 is scaled relative to other features in the 3D graph 352, the 3D graph 352 can be scaled without adding distortion.

The user controls 354 can allow selection of a particular partition on the 3D graph 352 (e.g., by a mouse click or touch). As one example, the user can select a partition 358. The data panel 354 can output data values (retrieved from the data set 116) associated with the selected partition. Moreover, as noted, the scalable data structure 119 may be updated (e.g., periodically or in real-time). In this situation, the 3D graph 352 and/or the data panel 304 can also be updated.

Furthermore, it is noted that in some examples, the user controls 356 can allow a user to view the 3D graph 352 from a point within a boundary of the 3D graph. For instance, in the second example, the 3D graph 352 may be viewed from an interior point (e.g., a center) in the 3D graph 352. In this situation, the graph data viewer 122 may be mounted on a console of an aircraft.

Continuing with the second example, from a perspective of the interior point (e.g., the center) in the 3D graph 352, the 3D graph 352 may resemble a multilayer radar "bug splat". In this situation, a pilot of the aircraft can employ the 3D graph 352 to assist in tactical decisions, including, but not limited to control of the aircraft. For instance, in situations of the second example where the aircraft is located in a hostile territory (e.g., a warzone), the pilot may elect to direct the aircraft towards an area with the least amount of detected radar. Conversely, in situations of the second example where the aircraft is located in a peaceful zone (e.g., near an airport) the pilot may direct the aircraft towards an area where the strongest radar signal is detected. Furthermore, in many flights, preplanning events of an aircraft flight path, such as route creation and generation accounts for many factors, but sometimes unknown/unforeseen factors (e.g., a small gust of wind, a cloud, etc.) warrant a quick modification/change to the aircraft flight path. The 3D graph 352 can act as a useful tool to assist the pilot in decision making for such "real-time" modifications to the flight path.

Referring back to FIG. 2, by employing the computing device 100, large amounts of data (e.g., "big data") can be visualized and correlations between data points can be easily ascertained. Moreover, in some examples, a machine learning system (e.g., a neural network, a Bayesian network, a linear regression analyzer, etc.) can access the scalable data structure 119 to determine correlations between data values in the data set. For instance, such a machine learning system can be programmed/configured with algorithms to make statistical interpretations of the data set 116 based on a geometric form of the resultant 3D graph. Moreover, in some such situations, such algorithms may be relatively simple since constraint of a geometric form of the 3D graph allows the machine learning system to directly analyze the 3D graph and determine correlations for values in the data set 116.

Visualizing large amounts of data with a 3D graph can reduce the "cognitive burden" required to analyze data sets, such as the data set 116. Specifically, by employment of the graph data viewer 122, a user can quickly "fly through" data values to identify outliers that may be more difficult to identify with conventional data display methods (e.g., spreadsheets). Moreover, as explained herein, each partition can be assigned multiple parameters. In this manner, in contrast to a single axis graph, the 3D graph allows users to simultaneously view multiple parameters at different scales, as illustrated, for example, by the 3D graph 250 of FIG. 7.

Additionally, as illustrated and described with respect to FIG. 2, the graph data viewer 122 may be operating on a different computing device than the computing device 100 that executes the rendering engine 112. Accordingly, in some situations, multiple instances of the graph data viewer 122 can be implemented concurrently. In this manner, a plurality of users can view the same 3D graph concurrently. Alternatively, the plurality of users (or some subset thereof) could concurrently view different 3D graphs that represent different data sets 116. Still further, in some situations, multiple instances (e.g., windows) of the graph data viewer 122 can be output on the same computing device to allow side-by-side comparisons of different data sets 116 and/or the same data set 116 at a different scale.

Figure 10:
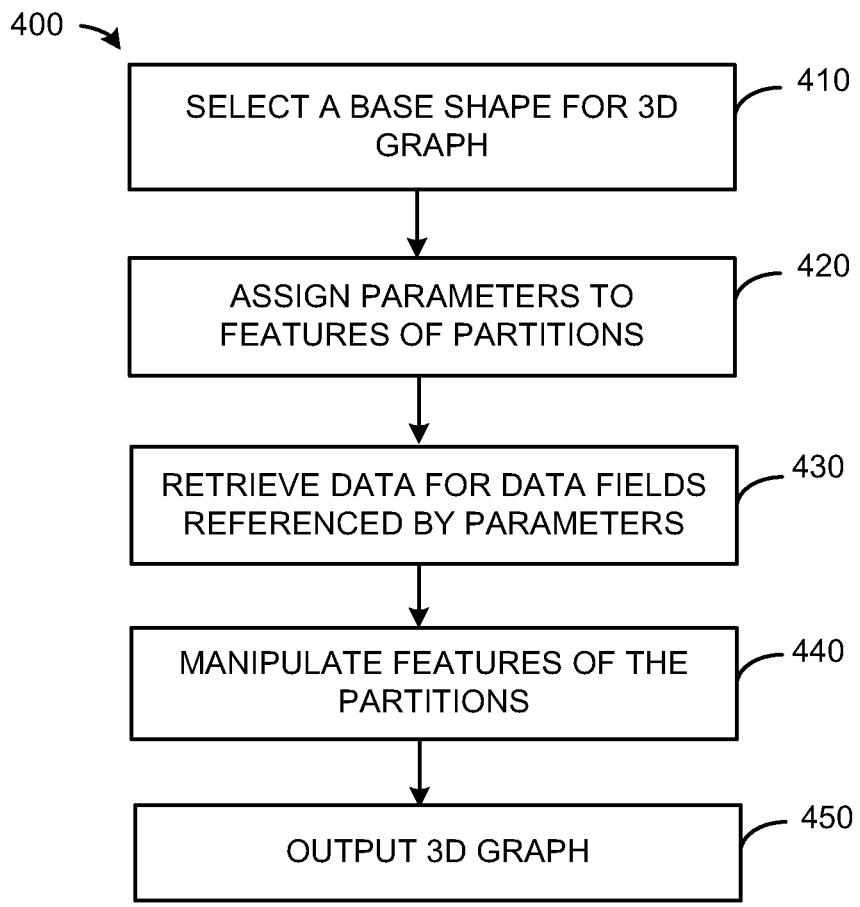
FIG. 10 illustrates a flowchart of an example method for generating a 3D graph.

In view of the foregoing structural and functional features described above, an example method will be better appreciated with reference to FIG. 10. While, for purposes of simplicity of explanation, the example method of FIG. 10 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 10 illustrates a flowchart of an example method 400 for generating a 3D graph. The method 400 can be implemented, for example by the system 50 of FIG. 1 and/or the computing device 100 of FIG. 2. At 410, a base shape for the 3D graph can be selected (e.g., by a rendering engine). In some examples, the base shape can be selected based on a number of constraints that binds a data set. In other examples, the base shape can be selected in response to user input. Additionally or alternatively, the rendering engine can provide a plurality of viable base shapes to select for a particular data set. At 420, parameters that reference data fields of a data set can be assigned to features of partitions in the 3D graph. The features can include, for example, edges or a surface of each partition in the 3D graph (or some subset thereof).

At 430, values for the data fields referenced by parameters assigned to the features of the partitions can be retrieved from the data set by the rendering engine. At 440, the rendering engine can manipulate (scale) features of the partitions of the base shape to form the 3D graph. At 450, the 3D graph can be output (e.g., by a graph data viewer). The outputting of the 3D graph can include changing an orientation, scale and/or viewing perspective of the 3D graph.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine executable instructions, the machine executable instructions which when executed by a processor implement:

a rendering engine that generates, in real time based on updates to a data set, a three-dimensional (3D) graph, wherein the 3D graph comprises a plurality of partitions contiguously connected and each of the plurality of partitions are arranged about a 3D surface of the 3D graph, wherein each of the plurality of partitions are a tile shape that provides regular tiling across the 3D surface of the 3D graph, wherein each partition corresponds to a respective data record in the data set, wherein a surface of each partition corresponds to a given parameter that references a given data field in the respective data record, and visual indicia of the surface of each partition varies as a function of a value for the given data field of the respective data record, wherein a subset of edges of each partition corresponds to a parameter that references a different data field in the respective data set, and visual indicia of the edge of each partition varies based on a value of another data field in the respective data set, wherein at least one visual indicia of a given edge is an angle of intersection of the given edge with another edge in a respective partition, wherein the visual indicia of the surface of each partition is an apex extending perpendicularly from the 3D surface of the 3D graph, wherein a plurality of apices are formed about the 3D surface of the 3D graph by the intersection of at least three partitions of the plurality of partitions, wherein a height of a given apex of the plurality of apices and an angle of intersection between the respective at least three partitions vary as a function of values based on the data fields in the respective data set corresponding to each of the at least three partitions that intersect to form the given apex of the plurality of apices.

2. The medium of claim 1, wherein each of the apices are connected to the edges of the respective at least three partitions of the plurality of partitions of the 3D graph to form a polyhedron.

3. The medium of claim 1, wherein the visual indicia for an edge of each partition is at least one of a thickness, a pattern, a color and a length of the edge based on a value for the other data field and wherein the 3D graph is scalable.

4. The medium of claim 1, wherein the 3D surface forms a spheroid.

5. The medium of claim 1, wherein the tile shape of each of the plurality of partitions is a triangle.

6. The medium of claim 1, wherein the tile shape of each of the plurality of partitions is a hexagon.

7. A non-transitory machine readable medium having machine executable instructions, the machine executable instructions which when executed by a processor implement:

a rendering engine that generates a three-dimensional (3D) graph, in real time based on updates to a data set, the 3D graph being stored in a scalable data structure, wherein the 3D graph comprises a plurality of partitions contiguously arranged on a surface of a spheroid, wherein each of the plurality of partitions are arranged over one of a plurality of tile shapes arranged about a 3D surface of the 3D graphs, wherein the plurality of tile shapes provide regular tiling across the 3D surface of the 3D graph, wherein each partition corresponds to a respective data record in the data set, wherein each partition has a surface and a subset of edges, wherein the surface of a given partition has visual indicia indicating a given parameter that references a given data field in the respective data record, wherein the subset of edges have visual indicia indicating another parameter that references another data field in the respective data record, where at least one visual indicia for a given subset of edges is an angle of intersection between of a given edge in the subset of edges with another edge in the subset of edges, wherein the visual indicia of the surface of each partition is an apex extending perpendicularly from the 3D surface of the 3D graph, wherein a plurality of apices are formed about the 3D surface of the 3D graph by the intersection of at least three partitions of the plurality of partitions, wherein a height of a given apex of the plurality of apices and an angle of intersection between the respective at least three partitions vary as a function of values based on the data fields in the respective data set corresponding to each of the at least three partitions that intersect to form the given apex of the plurality of apices, and a graph data viewer that displays the 3D graph stored in the scalable data structure.

8. The medium of claim 7, wherein the graph data viewer provides user controls for changing an orientation of the 3D graph.

9. The medium of claim 7, wherein the graph data viewer provides user controls for changing a viewing perspective of the 3D graph.

10. The medium of claim 9, wherein the user controls allows the user to set the viewing perspective to an interior point in the 3D graph.

11. The medium of claim 7, wherein the graph data viewer provides user controls for changing a scale of the 3D graph.

12. The medium of claim 7, wherein the surface of each partition on the 3D graph corresponds to a given parameter that references a given data field in the respective data set, and visual indicia of the surface of each partition varies as a function of a value for the given data field.

13. The medium of claim 7, wherein the tile shape of each partition is one of a triangle and a hexagon.

14. The medium of claim 7, wherein the graph viewer outputs the 3D graph and another 3D graph stored in the scalable data structure concurrently.

15. A method comprising:
assigning, by a rendering engine operating on a computing device, parameters that reference different data fields of data records to features of a surface and a subset of edges of a plurality of partitions for a three-dimensional (3D) graph, wherein each of the plurality of partitions are arranged over one of a plurality of tile shapes arranged about a 3D surface of the 3D graph, wherein the plurality of tile shapes provide regular tiling across the 3D surface of the 3D graph, wherein each partition corresponds to a respective data record in a data set;
varying, by the rendering engine, in real time based on updates to a data set, indicia of the features of the surface and the subset of edges of the partitions of the 3D graph based on values in the data fields referenced by the parameters, wherein at least one indicia of a given subset of edges is an angle of intersection of a given edge in the subset of edges with another edge in the subset of edges, wherein the visual indicia of the surface of each partition is an apex extending perpendicularly from the 3D surface of the 3D graph, wherein a plurality of apices are formed about the 3D surface of the 3D graph by the intersection of at least three partitions of the plurality of partitions, wherein a height of a given apex of the plurality of apices and an angle of intersection between the respective at least three partitions vary as a function of values based on the data fields in the respective data set corresponding to each of the at least three partitions that intersect to form the given apex of the plurality of apices; and
outputting at a graph data viewer, the 3D graph.

* * * * *